Oct. 26, 1943.   R. R. REED ET AL   2,332,667
GAUGE
Filed Dec. 2, 1942

INVENTORS.
Ray R. Reed &
Jarl W. Hanson.
Geo Stevens
atty.
BY

Patented Oct. 26, 1943

2,332,667

UNITED STATES PATENT OFFICE 2,332,667

GAUGE

Ray R. Reed and Jarl W. Hanson, Duluth, Minn.

Application December 2, 1942, Serial No. 467,644

4 Claims. (Cl. 33—163)

This invention relates to measuring instruments and has special reference to such a device especially for use by dentists, the instant embodiment being a combined axial and transverse gauge, most conveniently adapted for use in fitting dental bridges or the like.

The requisite delicacy of such fitting is well known to dentists as is also well known the large proportion of maladjustments that result from lack of proper metering of the space to be bridged, and to fill this long felt need, is the principal object of the instant invention.

Another object is to provide such an instrument susceptible of universal use within the mouth and one that may be most delicately and conveniently adjusted to accomplish ideal results.

Another object is that of producing a combination of two measuring and gauging devices in a single instrument, the adjustment of which is exceedingly simple and of sturdy and durable type.

Other objects and advantages will appear in the further description thereof.

Referring now to the accompanying drawing forming part of this application and in which like reference characters indicate like parts—

Fig. 2 is a bottom plan view of Fig. 1.

Figure 1:
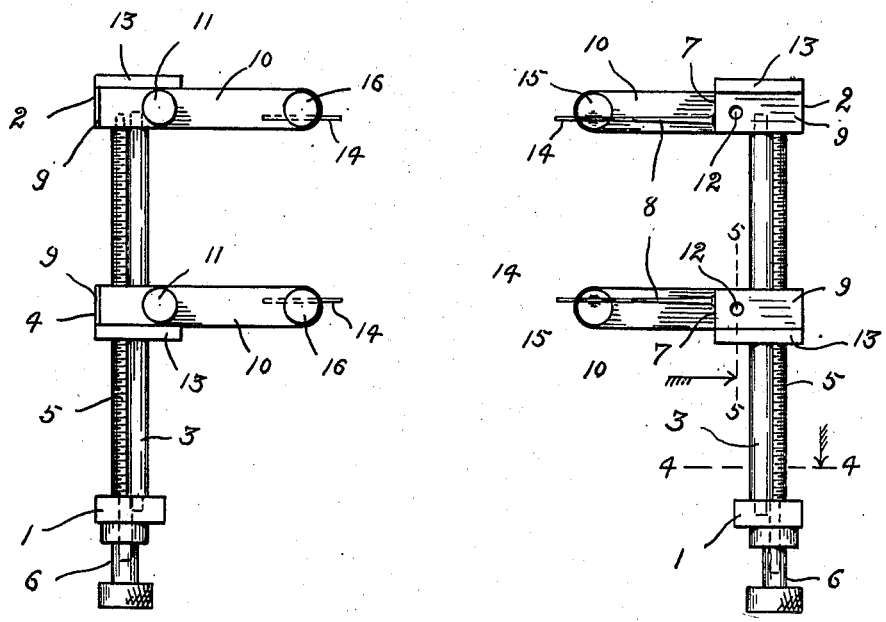
Fig. 1 is a top plan view of one of the combination instruments.
Figure 5:
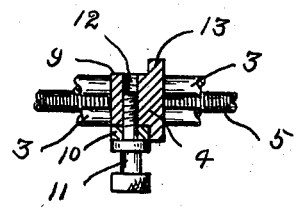
Fig. 5 is a section on the line 5—5 Fig. 2.
Figure 3:
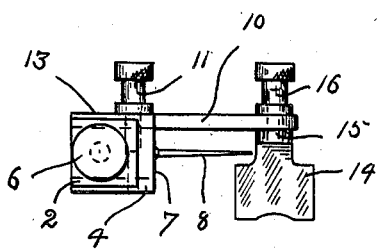
Fig. 3 is an elevation of the handle end of the instrument.
Figure 4:
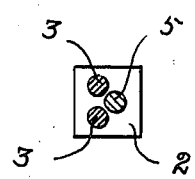
Fig. 4 is a section on the line 4—4 Fig. 2.

Referring now to the drawing, the body portion of the instrument comprises the two terminals or end members 1 and 2 spaced a suitable distance apart and rigidly united as by the two spaced rod-like members 3—3, it being understood that the entire instrument is of comparatively delicate and neat construction as is appropriate for use in and about the human mouth or oral cavity and in keeping with associated instruments as found in the dental profession.

Intermediate of the end members 1 and 2 and slidably carried upon the rods 3—3, is the member 4 preferably, a counterpart in form of the end member 2, though facing same when initially installed. For slidable operation of the member 4, we have provided the screw-threaded rod 5 journalled in the end members 1 and 2 and threaded within the member 4 so that any rotation of said rod will slidably operate upon the rods 3, the member 4, thus the direction of movement of the member 4 depending upon the direction of rotation of said rod 5. The diameter of this rod 5, where journalled in the end member 2, is reduced or stepped as indicated in dotted lines and the other extremity thereof also reduced and suitably threaded for the reception of the knurled handle 6 for convenient rotation of same without its reciprocation within the body portion of the instrument.

Each member 2 and 4 is substantially rectangular in form with a flat front face 7 carrying fixed therein and protruding therefrom, a groove gauging and marking finger or tine 8 and these tines are inwardly of the center of said face or adjacent the inner edge thereof so that when the members 2 and 4 are close together, the same will be true of the tines which insures their practical use within narrow limits, between teeth, for example, their exact position being more clearly seen in Fig. 2, of the drawing. In this same Fig. 2, will be seen to best advantage, the depressed or stepped areas 9, which in this showing are not occupied by the gauge carrying arms 10, they of course, being the same on both the upper and lower face of each member 2 and 4.

These areas are for the selective reception of the gauge carrying arms 10 which are each held in place thereupon by the elongated thumbscrew 11 having a screw-threaded shank for application within either end of the through hole 12. The object of these areas being depressed or stepped is to provide an upstanding flange-like portion 13, at least upon one side thereof, so as to insure positive and uniform alignment of said supports when applied thereto, the same being very essential for proper accurate operation of the instrument.

Upon the outermost end of each arm 10 is adjustably carried the axial gauging blade 14 for engagement with outer surfaces of a tooth normally in axial alignment therewith.

The upper central portion of each blade 14 is of hub-like construction as at 15 for stable engagement with the under surface of the arm 10 and with a threaded stem-like portion extending through said arm for holding reception of the elongated thumbscrew 16 similar to the thumbscrews 11 and which is also provided with a hub-like portion for firm contact with the uppermost surface of said arm.

It will be noted that the blades 14 are each set to one side of the center of the hub portion 15 thereof, this being for the same reason that the tines 8 are similarly positioned, to wit, for close work.

It will readily be seen that the instrument, assembled as shown, could be used only in gauging teeth within the lower left side of the mouth or upper right side thereof, while, when the blade carrying arms 10 are mounted upon their receiving areas 9 upon the opposite sides of the members 2 and 4, the reverse application of the instrument is available, thus its most convenient universal use within the mouth insofar as the axial gauging elements are concerned, and that without interference whatever by the transverse or groove gauging tines 8.

The tines 8 of course, are only available for use when the other gauging elements are removed, but are at all times at hand and ready for adjustment as desired.

Having thus described our invention and which obviously may be varied considerably from the embodiment here shown without departing from the spirit of the invention, what we claim and desire to secure by Letters Patent is:

1. In a gauge of the type described, relatively movable gauge carrying members, an axial gauge supporting arm removably carried upon each of said members and extendable in parallel relation from either side of said members and an axial gauge adjustably carried by and depending from the free end of said arms.

2. In a gauge of the type described, relatively movable members, each having a stepped area formed upon two opposite sides thereof, an axial gauge supporting arm removably mountable upon one of said stepped areas of each of said members and extendable in parallel relation to each other from either side of said members and a gauging member adjustably carried by the free end of each of said arms.

3. A dental gauge comprising a pair of spaced carrying members, a member mounted upon one end of said members, a similar member slidably mounted upon said members intermediate of their ends, a gauging element attachable to each of said members and extendable from either side thereof, whereby said slidable member may be moved relative to said end member for gauging certain teeth when extending in one direction, and other teeth when arranged to extend in the opposite direction.

4. A dental gauge, comprising a pair of spaced carrying members, a member fixed upon one end of said members, a similar member slidably mounted upon said spaced members intermediate of their ends, said fixed and slidable members being depressed or stepped upon opposite sides, a gauging element attachable to the stepped portion of each of said members and extendable optionally from either side thereof whereby said slidable member may be moved relative to said end member for gauging certain teeth when extending in one direction, and other teeth when arranged to extend in the opposite direction.

RAY R. REED.
JARL W. HANSON.